United States Patent [19]

Radnedge

[11] Patent Number: 5,035,788
[45] Date of Patent: Jul. 30, 1991

[54] ELECTROCHEMICAL DRILLING APPARATUS

[75] Inventor: Colin G. Radnedge, Bristol, England

[73] Assignee: Rolls-Royce plc, London, England

[21] Appl. No.: 515,568

[22] Filed: Apr. 27, 1990

[30] Foreign Application Priority Data

May 6, 1989 [GB] United Kingdom ............... 8910477

[51] Int. Cl.⁵ .................. B23H 3/04; B23H 9/10; B23H 9/14
[52] U.S. Cl. .................. 204/224 M; 204/279; 204/286; 204/297 R
[58] Field of Search ......... 204/297 R, 297 W, 129.55, 204/279, 224 M, 286

[56] References Cited

U.S. PATENT DOCUMENTS

| | | | |
|---|---|---|---|
| 3,332,869 | 7/1967 | Bent et al. | 204/297 W X |
| 3,803,015 | 4/1974 | Andrews | 204/224 M |
| 3,886,059 | 5/1975 | Mikulski | 204/224 M |
| 4,188,522 | 2/1980 | Baker | 219/69 M |

Primary Examiner—Donald R. Valentine
Attorney, Agent, or Firm—Oliff & Berridge

[57] ABSTRACT

Electrodes of an electro-chemical machining tool are in the form of tubes which carry electrolyte to the surface of the article to be machined. The ends of the tubes adjacent the article are gripped between opposed clamping surfaces (13,14) of a block (10). One of those clamping surfaces 14 has a series of facets (15,16,17) with each facet inclined relative to the adjacent facet. The tubes are gripped between those facets (15,16,17) and serrations (18) in the opposed surface (13). This causes the tubes to have different orientations along the line of those tubes due to the relative inclination of the facets (15,16,17). This enables the tubes to conform to the trailing edge of e.g. a turbine blade.

8 Claims, 1 Drawing Sheet

ELECTROCHEMICAL DRILLING APPARATUS

BACKGROUND OF THE INVENTION

1. Field of the Invention

The present invention relates to a support structure for electrodes of an electro-chemical machining tool.

2. Description of the Related Art

In electro-chemical machining, machining electrolyte is carried up to the surface being machined by a plurality of glass tubes, which thus form the electrodes of the electro-chemical machining tool. The ends of those tubes are arranged adjacent the article to be machined, and as machining occurs holes corresponding to the tubes are cut into the article. This process is used, for example, in drilling cooling holes in the trailing edge of turbine blades or air flow guide vanes of a gas turbine engine. In the terminology of such engines, blades are in the rotating parts of the engine whilst vanes are non-rotating parts.

It is necessary that the tubes be supported so that they are orientated in the correct direction. In order to achieve this, it is usual for the tubes to be clamped between opposed surfaces of two parts of a guide block. An example of this is shown in U.S. Pat. No. 4,188,522.

In existing support structures of this type, where the tubes are clamped between clamping surfaces of two parts of a guide block, one of the clamping surfaces is normally provided with serrations, the width of which is selected in dependence on the tube diameter, and the pitch between the tubes, so that each tube is held in a 3-point mounting, formed by two sides of a serration and the opposed clamping surface of the other part of the block.

In the support structure shown in U.S. Pat. No. 4,188,522, and indeed in all other such structures known to the applicant, the longitudinal axes of the tubes are parallel. However, it has been realised that this causes a problem when drilling e.g. the trailing edge of a turbine blade. Such a blade has an axial twist along its length, and therefore when the line of parallel tubes are placed adjacent the blade edge, only a limited number of tubes will be accommodated on a chord at the curve of the trailing edge of the blade, and that number will further be limited because only some of the tubes which are accommodated will intersect the internal cooling passages within the blade. In practice, it is found that only about 7 holes can be drilled, based on a normal tube pitch, and since 40 to 50 holes are required along the full length of the blade, it is necessary for the hole cutting process to be carried out in a series of passes of the electro-chemical cutting tool along the length of the blade, with only a small number of holes being cut in each pass. The result is that the drilling of the cooling holes in the trailing edge of the turbine blade or vane is a time consuming process.

SUMMARY OF THE INVENTION

The present invention, therefore, seeks to reduce the number of cutting operations needed to cut a series of holes along a curved path, such as the edge of a turbine blade.

At its most general, the present invention proposes that the longitudinal axes of the tubes vary in orientation along the line of those tubes.

Thus, the present invention may provide an electrode support structure for an electrochemical machining tool, the structure comprising a guide block having two parts and a plurality of electrode tubes, the electrode tubes being clamped between opposed surfaces of the two parts of the block such that the tubes are substantially in a line, wherein the directions of the longitudinal axes of the tubes vary along that line.

Normally, that line will be curved so that the ends of the tubes may conform to the shape of the trailing edge of the turbine blade. It should be noted that it is not essential that the longitudinal axes of the tubes be perpendicular to the edge of the blade; there are some situations where it is desired that the holes be inclined to that trailing edge, and this can be achieved by suitable clamping of the tubes. As in the known systems, the tubes may be clamped by providing serrations on one clamping surface of one of the blocks, so that the tubes are held between those serrations and the opposed surface of the other block. The direction of cutting of the electrodes is then determined by the orientation of the serrations in the block.

The variation in direction of the longitudinal axes of the tubes may be continuous along the line. However, it is easier to provide a system in which one of the clamping surfaces is stepped, and there is a variation in angle of those steps along the length of the surface. Thus, there will be a series of groups of tubes along the length of the line, with each group at a particular "step", and with each tube in that group being substantially parallel. The variation in angle then occurs between the groups.

It is normally desirable that the tubes are clamped in a straight line on the opposite side of the block from the article to be machined and, to prevent damage to the tubes where they exit from the block away from the article to be machined, it is preferable that a flare be provided in the clamping surface at the opposite side of the block from the article to be cut. In this way the edges of the clamping surfaces are clear of the tubes.

BRIEF DESCRIPTION OF THE DRAWINGS

An embodiment of the invention will now be described, by way of example, with reference to the accompanying drawings in which.

DETAILED DESCRIPTION OF PREFERRED EMBODIMENTS

Figure 1:
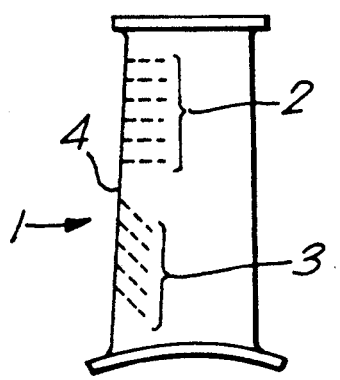
FIGS. 1 to 3 show side, plan, and end views of a turbine blade.
Figure 2:
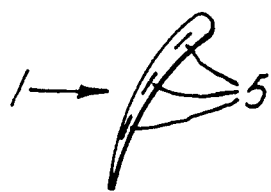
Figure 3:
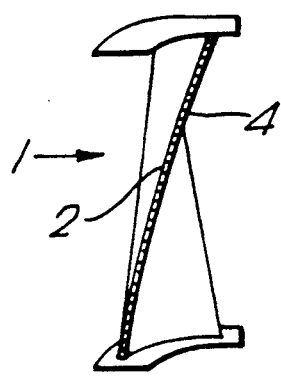

Referring first to FIGS. 1 to 3 a turbine blade 1 of a gas turbine engine has cooling holes 2 or 3 formed therein. As illustrated in FIG. 1, those cooling holes may be perpendicular to the trailing edge 4 of the blade 1, as shown by holes 2, or may be inclined to that trailing edge 4, as shown by holes 3. The holes 2 or 3 extend to internal cooling passages 5 within the blade 1, which passages 5 are shown in FIG. 2.

As can be seen from the end view of FIG. 3, the trailing edge 4 of the blade 1, into which the holes 2 or 3 are cut, is not straight but forms a curve due to the axial twist of the blade 1. Thus, not only do the holes 2 lie along a curved path, but their axes must vary one relative to the other along the length of the trailing edge 4 of the blade 1. As will be described below, the present invention seeks to orientate electrode tubes to this trailing edge 4.

Figure 4:
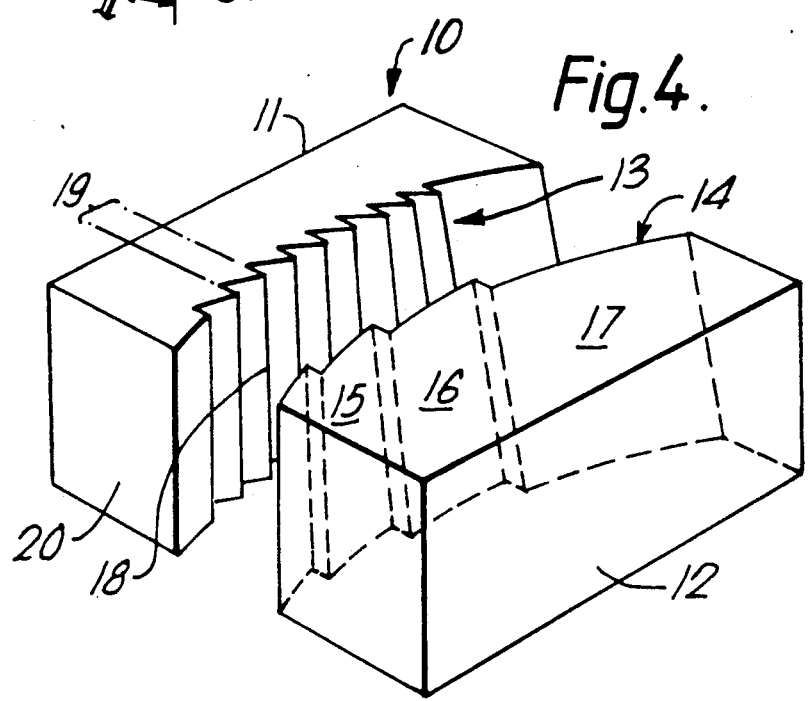
FIG. 4 shows a guide block for use in a support structure according to the present invention.

FIG. 4 shows a guide block for supporting the electrode tubes in a structure according to the present invention. That guide block 10 comprises two parts 11, 12 with opposed clamping surfaces 13, 14 between which the electrode tubes will be clamped. Apart from the surfaces 13, 14, the block has a generally rectangular surface. As can be seen in FIG. 4, one of the opposed clamping surfaces 14 is stepped in a plurality of facets 15, 16 and 17, with each of those facets being plane, but the facets 15, 16, 17 being inclined one relative to the other. The other clamping surface 13 of the block 10 is shaped to match the surface 14, but also has serrations 18 therein, with a pitch 19 corresponding to the desired pitch of the electrode tubes. The electrode tubes are positioned so that they lie within the serrations 18, and are gripped between the surfaces of those serrations 18 and the adjacent part of the opposed clamping surface 14, in a 3-point contact. For drilling holes in a gas turbine blade, the pitch 19 is desirably about 0.76 mm. As illustrated in FIG. 4, the serrations 18 extend generally parallel to the side 20 of the block, and so are suitable for drilling the perpendicular holes 2 shown in FIG. 1. By inclining those serrations 18 at a suitable angle, the inclined holes 3 may be drilled.

The inclination of the facets 15, 16 and 17 one relative to the other is such that they follow generally the trailing edge 4 of the gas turbine blade 1. Of course, it would be possible to arrange for a continuous variation along the length of the surface 14, but the arrangement shown in FIG. 4 is easier to machine, and will still achieve a satisfactory result. It should also be noted that the surfaces 13, 14 do not extend across the block perpendicular to the side 20, but will be curved to match the curvature of the trailing edge of the turbine blade 1.

Figure 5:
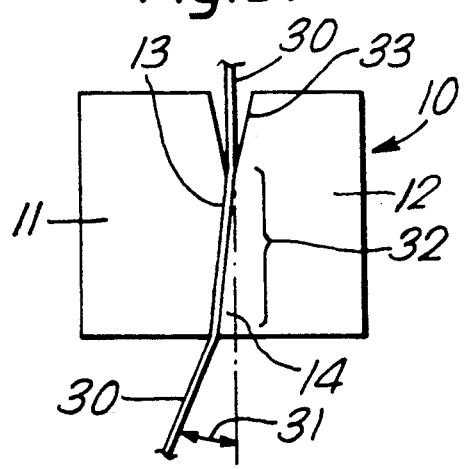
FIG. 5 shows an end view of the guide block of FIG. 4.

FIG. 5 shows cross-section through the block 10 of FIG. 4, illustrating the gripping of a glass electrode tube 30 between the two parts, 11, 12 of the block. The glass tube 30 illustrated in FIG. 5 emerges from the bottom of the block 10 at one angle, but the stepping of the surface 14 will mean that subsequent tubes emerge at a different angle, so that there is a variation in angle along the line of the tubes as illustrated by arrow 31.

FIG. 5 also shows that the tube 30 is gripped between the two parts 11, 12 of the block along only part 32 of its length, and there is a flared region 33 of the opposed surfaces 13, 14 on the opposite side of the block from the article to be cut. That flared region permits further bending of the glass tube 30, so that the line of glass tubes may be clamped above the block 10 in a straight line. If the third region 33 was not provided, then there is the risk of damage to the tube at the point of which it emerges from the block 10.

The number of tubes provided along the length of the block depends on the number of holes to be drilled into the gas turbine blade, but typically 40 to 50 tubes are needed.

The present invention has been described above with reference to the drilling of holes in a gas turbine blade, but it is applicable to drilling of holes in air flow guide vanes and indeed in any structure where the holes to be drilled are not parallel, but are inclined one relative to the other.

I claim:

1. An apparatus for electrochemically drilling a plurality of non-parallel holes simultaneously along a curved path in a workpiece, the apparatus comprising:
   (a) a plurality of electrode tubes; and
   (b) a guide block separable into two parts having respective first and second opposed surfaces, the guide block being provided in the first surface with a set of serrations each of which is adapted to hold a respective electrode tube whereby when the two surfaces are brought together the electrode tubes are clamped between said surfaces;
   wherein the surfaces are shaped and the serrations are orientated in the first surface so that the electrode tubes lie substantially in a line curved in a direction generally perpendicular to at least some of the longitudinal axes of the tubes, and the directions of the longitudinal axes of the tubes vary along that line, the curvature of said line corresponding at least approximately to the curvature of said path.

2. An apparatus as claimed in claim 1, wherein the variation in direction of the longitudinal axes of the electrode tubes is continuous along said line.

3. An apparatus according to claim 1, wherein the second surface is stepped in a plurality of facets, the orientation of each facet being inclined relative to the orientation of an or each adjacent facet, each electrode tube being clamped between its respective serration in the first surface and a said facet of the second surface.

4. An apparatus according to claim 3, wherein the serrations are provided as a series of groups, each group corresponding to a respective facet, the serrations within each group being substantially parallel and variation in orientation of serrations occurring between said groups.

5. An apparatus according to claim 3, wherein the facets are planar.

6. An apparatus according to claim 1, wherein the surfaces are flared away from the electrode tubes on a side of the block opposed to the workpiece to be drilled.

7. An apparatus, as claimed in claim 1, wherein the curvature of said line substantially corresponds to a curvature of an elongate workpiece having an axial twist in which said holes are electrochemically drilled.

8. An apparatus as claimed in claim 7, wherein the workpiece is a blade or vane of a gas turbine engine, and the path of the holes lies along an edge of said blade or vane.

* * * * *